June 8, 1965  R. DUCET  3,187,407

TOOL HOLDERS

Filed Jan. 10, 1963

*Inventor*

*Robert Ducet*

By

*Attorneys*

United States Patent Office 3,187,407
Patented June 8, 1965

3,187,407
TOOL HOLDERS
Robert Ducet, Gennevilliers, France, assignor to Societe des Poudres Metalliques et des Alliages Speciaux Ugine-Carbone, Paris, France, a French body corporate
Filed Jan. 10, 1963, Ser. No. 250,594
Claims priority, application France, Jan. 11, 1962, 884,538
2 Claims. (Cl. 29—96)

The present invention relates to tool holders for use in machine tools such as lathes, and having mechanical holding means and has for an object the incorporation of a device for the precision adjustment of a chip breaker to be associated with the tool bit.

It is a further object of the invention to provide a device wherein changing of the tool bit and of the chip breaker may be effected without altering the setting and without even moving the lathe tool.

The actual formation and disposal of the chips or swarf turned up by the tool depend upon the cutting angle of the tool bit, its clearance from the workpiece and the general shape of the tool bit. In order to prevent clogging of the tool bit by the chips or swarf therefore, it has already been proposed to provide a chip breaker on the tool holder, but without means for precision adjustment thereof in relation to the tool bit.

According to the invention there is provided a tool holder having means for clamping a chip breaker in working relation to the cutting edge of the tool bit, comprising a jaw member clampable to the base or support member of the tool bit holder to grip both the chip breaker and the tool, said jaw being movable by an adjustment member in relation to the cutting edge of the tool bit without affecting the position of the tool bit in relation to the tool bit holder.

The said jaw is clampable to the tool base or support member by a screw whose head passes through a slot in said jaw to allow the jaw to be moved in the direction of the longer axis of the slot.

Advantageously, the chip breaker has a shouldered rear portion forming a recess to receive the free end of a leaf spring secured beneath said jaw, whereby the chip breaker may be sprung into position in relation to the said jaw.

Preferably, the adjustment member comprises a screw engaging in a threaded underpart of said jaw and being located in a bore in said tool base or support member, one end of said screw working against the base or end wall of said bore and the other end of said screw working against a shoulder in said bore, rotation of said screw thus effecting substantially rectilinear movement of said jaw.

The tool may rest on an anvil removably secured to the base or support member of the tool holder.

Figure 1:
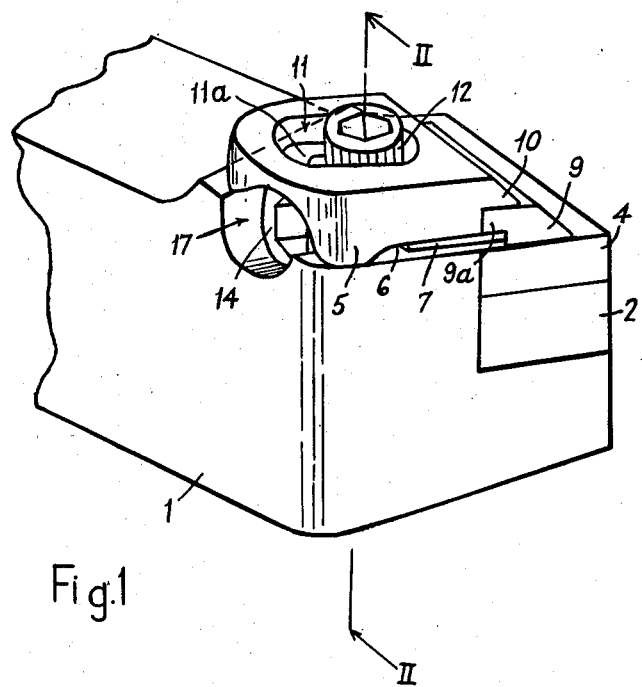
Figure 2:
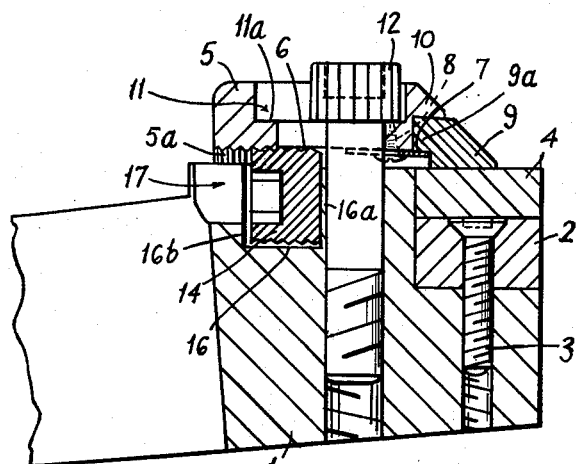

In order that the invention may be more clearly understood, reference will now be made to the accompanying drawings which show one embodiment thereof, merely by way of example, and in which FIGURE 1 shows a perspective view of the working end of the tool holder from one side and above, and FIGURE 2 shows a section of the device shown in FIGURE 1 along the line II—II thereof.

Referring to the drawings, the tool holder comprises a base or support member 1 having a recessed portion which receives an anvil or bit supporting plate which is removably secured to the body 1 by a counter-sunk screw 3. A tungsten carbide tool bit 4 rests on the anvil 2. A jaw 5 is located on the base 1 and has a slightly recessed part 6 in the underside thereof, in which a spring blade 7 is secured by two rivets 8 (only one of which is shown in FIGURE 2), passing upwardly into the jaw 5.

A chip breaker 9 has a rearwardly extending shoulder or projection 9a which is held between the spring blade 7 and a projecting lip 10 on the jaw 5. This chip breaker 9 is detachable and may be replaced, as required, by other chip breakers of different properties, e.g. hardness. When in place the chip breaker 9 presses down on the tool bit 4 and holds the latter in place on the anvil 2.

The jaw 5 has a slot 11, shouldered at 11a wherein engages a long cylindrically headed Allen screw 12 for locking and compression of the chip breaker 9 and tool bit 4 between the jaw 5 and the anvil 2. The Allen screw 12 is tightened and untightened by a conventional hexagonal Allen key. This key is a well-known device and has therefore not been illustrated. The slot 11 thus allows the jaw 5 to be moved in the direction of the longer axis of the slot when the screw 12 is slackened.

The adjustment device for the chip member 9 is constituted by an externally threaded Allen grub screw 14 which also is rotatable by an Allen key to cause the advance and withdrawal of the jaw 5 with respect to the tool bit 4. The lower part of the jaw 5 is provided with a part thread 5a corresponding to that of the grub screw 14. A bore 16 is provided in the upper part of the base 1 to provide a lodgement space for the lower part of the grub screw 14. This aperture is not threaded. The grub screw 14 is trapped between, on the one hand, the base or end wall 16a of the bore 16 and, on the other hand, a shoulder 16b on the base 1 of the tool holder. The part of the grub screw 14 engaging with the jaw 5, at a given time, effects the movement and positioning of the jaw 5, as will be readily apparent from the drawing, after slackening of the screw 12. When the grub screw 14 is turned by its key, it causes the jaw 5 to be advanced or withdrawn in relation to the tool bit 4 on the base 1, thereby enabling the chip breaker to be precisely positioned in relation to the cutting edge of the tool. An aperture 17 is provided partly in the base 1 of the tool holder and partly in the rear of jaw 5, for introducing its Allen key into the grub screw 14.

The same key may be used for tightening and untightening the Allen screw 12 and for turning the grub screw 14.

Once the adjustment has been determined, and the jaw 5 advanced to the required position, the Allen screw 12 is tightened by means of its key in order to lock all the elements of the tool holder. If, during the operation, it is necessary to change the tool bit 4, it is sufficient to loosen the screw 12 which loosens all the elements of the tool bit holder, replace the tool 4 and then to tighten the screw 12 once again, the adjustment of the chip breaker 9 being in no way affected, because it is held in its position of adjustment by screw 14.

It is also possible to substitute a ceramic tool bit which is thinner than the carbide tool bit 4 without altering the adjustment of the chip breaker, by using an anvil 2 of different thickness.

If the chip breaker 9 is to be replaced, it is only necessary to unlock the assembled elements of the tool holder by loosening the screw 12, sliding the projection 9a from between the spring blade 7 and the lip 10, thus freeing the chip breaker 9. Positioning is always ensured with precision, owing to the fact that the jaw 5 has not been moved.

The jaw 5 provided with the position regulating device in accordance with the invention is the same for so-called right hand or left hand tool holders and adjustment of the position of the chip breaker may be carried out during the operation while perfect behaviour of the tool is ensured.

The device in accordance with the present invention enables expendable tungsten carbide bits to be used. These bits may be of any relative thickness but are generally 3.17, 4.76, and 8 cm. thick, and a set of all three sizes could be provided with the tool holder.

It will be understood that the invention thus fulfills all the objects set forth, but has only been described by way of example and that it is in no way limited to the embodiment described hereinbefore, and that various modifications may be made, for example, the screw 12 need not be an Allen screw. Moreover, the bottom of screw 14 need not be threaded as it does not engage a threaded part, since it is of relatively large diameter and need not be turned a full revolution to effect the necessary adjustment.

I claim:

1. A tool holder comprising a support member having a bore therethrough, said bore having a base or end wall and a shoulder therein, a chip breaker and a tool bit separably mountable on said support member, a slotted jaw member, a first screw passing through said slot for clamping said jaw member to said support member to grip both the chip breaker and the tool bit, a leaf spring secured beneath said jaw member, a shouldered rear portion on said chip breaker, said shouldered portion being held to said jaw member by said leaf spring, a threaded under part on said jaw member, and a second screw engaging said threaded under part and being located in said bore in said tool support member, said second screw having two ends, one of said ends working against the base or end wall of said bore and the other of said ends of said second screw working against said shoulder in said bore, rotation of said second screw thus effecting substantially rectilinear movement in two directions of said jaw member after slackening of said first screw.

2. A tool holder comprising a support member having a bore therethrough, said bore having a base or end wall and a shoulder therein, a chip breaker and a tool bit separably mountable on said support member, a slotted jaw member, a first screw passing through said slot for clamping said jaw member to said support member to grip both the chip breaker and the tool bit, a leaf spring secured beneath said jaw member, a shouldered rear portion on said chip breaker, said shouldered portion being held to said jaw by said leaf spring, a threaded under part on said jaw member, a second screw engaging said threaded under part and being located in the bore in said support member, said second screw having two ends, one of said ends working against the base or end wall of said bore and the other of said ends of said second screw working against said shoulder in said bore, rotation of said second screw thus effecting substantially rectilinear movement in two directions of said jaw member after slackening of said first screw, and an anvil removably secured to said support member and located beneath said tool bit.

References Cited by the Examiner

UNITED STATES PATENTS

| 2,734,256 | 2/56 | Forward | 29—96 |
| 2,805,467 | 9/57 | Greenleaf | 29—96 XR |
| 2,883,737 | 4/59 | Wilson | 29—96 |
| 2,967,345 | 1/61 | Novkov | 29—96 |

FOREIGN PATENTS

| 1,164,677 | 5/58 | France. |
| 1,208,907 | 9/59 | France. |
| 828,593 | 2/60 | Great Britain. |
| 868,012 | 5/61 | Great Britain. |

WILLIAM W. DYER, Jr., *Primary Examiner.*